United States Patent
Freeman et al.

(10) Patent No.: US 12,382,925 B1
(45) Date of Patent: Aug. 12, 2025

(54) ANIMAL FEEDER

(71) Applicant: Wicked Feeder Solutions, LLC, Rock Hill, SC (US)

(72) Inventors: Bobby Allen Freeman, Rock Hill, SC (US); Robert Scott McCormick, Nales, FL (US)

(73) Assignee: Wicked Feeder Solutions, LLC, Rock Hill, SC (US)

( * ) Notice: Subject to any disclaimer, the term of this patent is extended or adjusted under 35 U.S.C. 154(b) by 0 days.

(21) Appl. No.: 19/065,206

(22) Filed: Feb. 27, 2025

(51) Int. Cl.
*A01K 5/02* (2006.01)

(52) U.S. Cl.
CPC ................... *A01K 5/0225* (2013.01)

(58) Field of Classification Search
CPC ........ A01K 5/02; A01K 5/0225; A01K 5/025; A01K 5/0233; A01K 5/0241; A01K 5/0114; A01K 5/0291; A01K 5/0275; A01K 5/0258
See application file for complete search history.

(56) References Cited

U.S. PATENT DOCUMENTS

| | | | |
|---|---|---|---|
| 1,172,913 A | 2/1916 | Slater | |
| 4,312,298 A | 1/1982 | Swearingin | |
| 5,701,841 A * | 12/1997 | Fasino | A01K 39/012 119/52.2 |
| 10,314,289 B1 | 6/2019 | Harding | |
| RE48,343 E * | 12/2020 | Donegan | A01K 39/012 |
| 11,412,706 B2 * | 8/2022 | Freeman | A01M 31/008 |
| 2006/0000417 A1 | 1/2006 | Loewe | |
| 2012/0055410 A1 * | 3/2012 | Cote | A01K 39/0113 119/52.3 |
| 2021/0204509 A1 * | 7/2021 | Staples | A01K 5/025 |
| 2022/0346348 A1 * | 11/2022 | Freeman | A01K 5/0291 |

* cited by examiner

*Primary Examiner* — Ebony E Evans
(74) *Attorney, Agent, or Firm* — Shumaker, Loop & Kendrick, LLP; S. Alexander Long, Jr.; Jonathan M. Hines

(57) ABSTRACT

An animal feeder includes: a tray assembly defining at least one sloped feed dish; a reservoir communicating with the tray assembly, the reservoir having a fill opening; dispensing openings formed in a wall of the reservoir configured to permit granular animal feed to flow by gravity from the reservoir into the at least one sloped feed dish; and wherein each of the dispensing openings is partially blocked by at least one finger formed in the wall of the reservoir.

20 Claims, 21 Drawing Sheets

ANIMAL FEEDER

BACKGROUND OF THE INVENTION

This invention relates to an animal feeder intended to dispense attractant (e.g., corn or some other grain or feed) to animals, for example feral animals such as deer, elk and the like. Animals are fed in this way to bring them into an area where they can be hunted. For example, hunters will set out a feeder to attract deer into a hunting area. In many cases this practice is also carried out as part of a means of thinning a game animal population down to a level that is manageable within the context of the geographical location and size of the area where the population is present. Over-population results in an increase in disease, crowding into residential areas and onto roads, streets and freeways where collisions with vehicles have become commonplace. Animal feeders of this type are also suitable for attracting wildlife to areas where they can be viewed and enjoyed by humans (backyards etc.). Animal feeders of this type could also be used to attract wildlife in overpopulated areas to move them to less populated areas, manage disease, and even to capture and remove wildlife causing destruction of property or creating danger to include wildlife/human conflict. Animal feeders of this type could also be used to feed farm animals or domestic animals. This includes land animals as well as birds (e.g., pheasants, ducks, geese).

Some animal feeders are wind or battery powered, and have mechanisms that disperse grain onto the ground around the feeder. Other feeders are gravity fed, and rely on the grain to fall into an access opening where it can be eaten by an animal. Known prior art gravity feeders have narrow, tube-like openings that are prone to clogging and jamming, thus preventing proper and adequate distribution of grain to the animals as intended.

BRIEF SUMMARY OF THE INVENTION

Shortcomings of the prior art are overcome and additional advantages are provided through the provision of an animal feeder, including: a tray assembly defining at least one sloped feed dish; a reservoir communicating with the tray assembly, the reservoir having a fill opening; dispensing openings formed in a wall of the reservoir configured to permit granular animal feed to flow by gravity from the reservoir into the at least one sloped feed dish; and wherein each of the dispensing openings is partially blocked by at least one finger formed in the wall of the reservoir.

According to some embodiments, the tray assembly includes first and second trays joined to each other, defining a gable roof shape.

According to some embodiments, the first and second trays are joined at mutually overlapping top flanges.

According to some embodiments, the reservoir is generally cylindrical.

According to some embodiments, the dishes include drain openings.

According to some embodiments, each of the dispensing openings is formed by a T-shaped slot in wall of the reservoir, the T-shaped slot also forming a pair of opposed fingers.

According to some embodiments, the animal feeder further includes a lid for covering the fill opening.

According to some embodiments, the lid and the fill opening have complementary dovetail shapes.

According to some embodiments, the reservoir is defined by a pair of spaced-apart end plates interconnected by a pair of spaced-apart side panels.

According to some embodiments, the end plates have tabs which are received in slots of the side panels; and the side panels have tabs which are received in slots of the tray assembly.

According to some embodiments, the animal feeder of further includes a cladding panel attached to an exterior of the reservoir, the cladding panel comprising a tree bark surface configuration.

According to some embodiments, the tray assembly includes first and second feed dishes on opposite sides of the reservoir.

According to some embodiments, each feed dish is bounded by a raised lip.

According to some embodiments, the animal feeder is adapted to be stacked in an array of components prior to assembly for shipping.

Also disclosed herein is an animal feeder, including: first and second trays defining sloped first and second feed dishes, the first and second trays connected at mutual top flanges defining a gable roof shape; first and second end plates connected to the first and second trays; first and second side panels connected to the end plates and the trays, such that the end plates and the side panels cooperatively define a generally cylindrical reservoir communicating with the tray assembly, the reservoir having a fill opening; and a plurality of dispensing openings formed in the side panels configured to permit granular animal feed to gravity flow from the reservoir into the sloped first and second feed dishes.

According to some embodiments, the end plates have tabs which are received in slots of the side panels; the side panels have tabs which are received in slots of the first and second trays; and the first and second trays have tabs which are received in slots of the end plates.

According to some embodiments, each dispensing opening is partially blocked by at least one finger formed in one of the side panels.

According to some embodiments, each of the dispensing openings is formed by a T-shaped slot in wall of the reservoir, the T-shaped slot also forming a pair of opposed fingers.

According to some embodiments, the first and second trays, the first and second end plates, and the first and second side panels are formed from sheet metal.

According to some embodiments, the animal feeder further includes a cladding panel attached to each of the side panels, the cladding panels including a tree bark surface configuration.

Also disclosed is a method of making an animal feeder, including: cutting a plurality of blanks from sheet material, forming at least one flange in at least one of the blanks and forming at least one opening in at least one of the blanks, so as to define a plurality of components, the plurality of components configured to define the animal feeder when assembled, wherein the animal feeder includes: a tray assembly defining at least one sloped feed dish; a reservoir communicating with the tray assembly, the reservoir having a fill opening; and dispensing openings formed in a wall of the reservoir configured to permit granular animal feed to flow by gravity from the reservoir into the at least one sloped feed dish.

According to some embodiments, each of the dispensing openings is partially blocked by at least one finger formed in the wall of the reservoir.

According to some embodiments, each of the dispensing openings is formed by a T-shaped slot in wall of the reservoir, the T-shaped slot also forming a pair of opposed fingers.

According to some embodiments, the plurality of components includes: first and second trays defining sloped first and second feed dishes; first and second end plates; and first and second side panels, wherein the side panels include the dispensing openings.

According to some embodiments, the plurality of components includes a lid.

According to some embodiments, each of the side panels is a segment of a cylinder, and includes a top flange.

According to some embodiments, each of the trays includes a top flange and a bottom flange.

According to some embodiments, at least one of the components includes a connector tabs, and a mating component includes slots complementary to the connector tabs.

According to some embodiments, the metho further includes joining the components by inserting the connector tabs into the respective slots, and bending the connector tabs over.

According to some embodiments, the sheet material is metal.

According to some embodiments, the blanks are cut by a laser cutting process.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
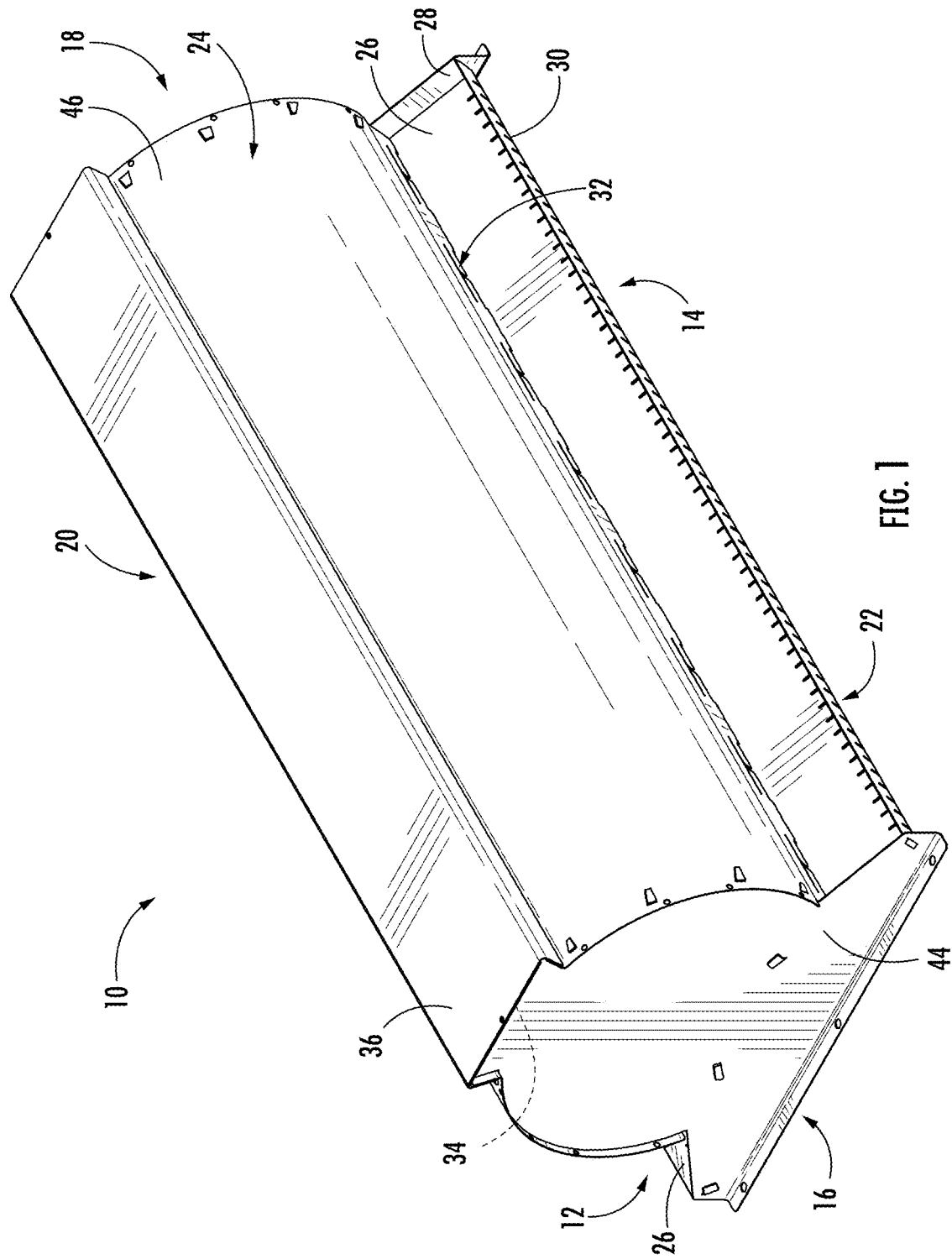
FIG. 1 is a perspective view of an exemplary feeder.
Figure 2:
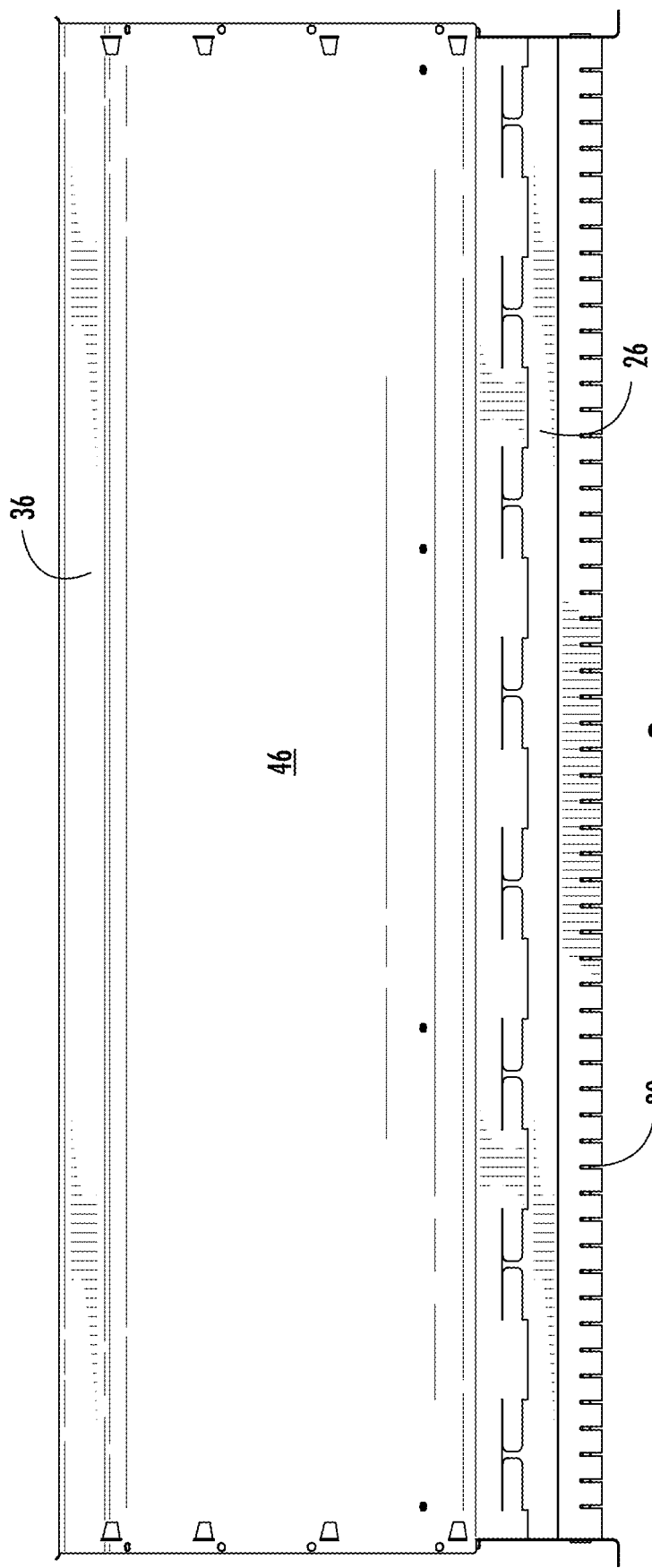
FIG. 2 is a side elevation view of the feeder of FIG. 1.
Figure 3:
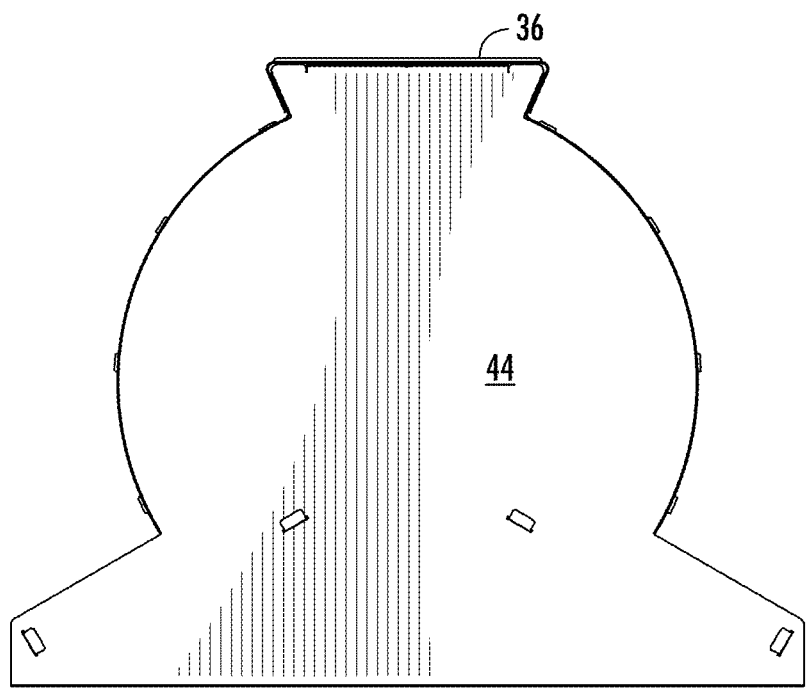
FIG. 3 is a front elevation view of the feeder of FIG. 1.
Figure 4:
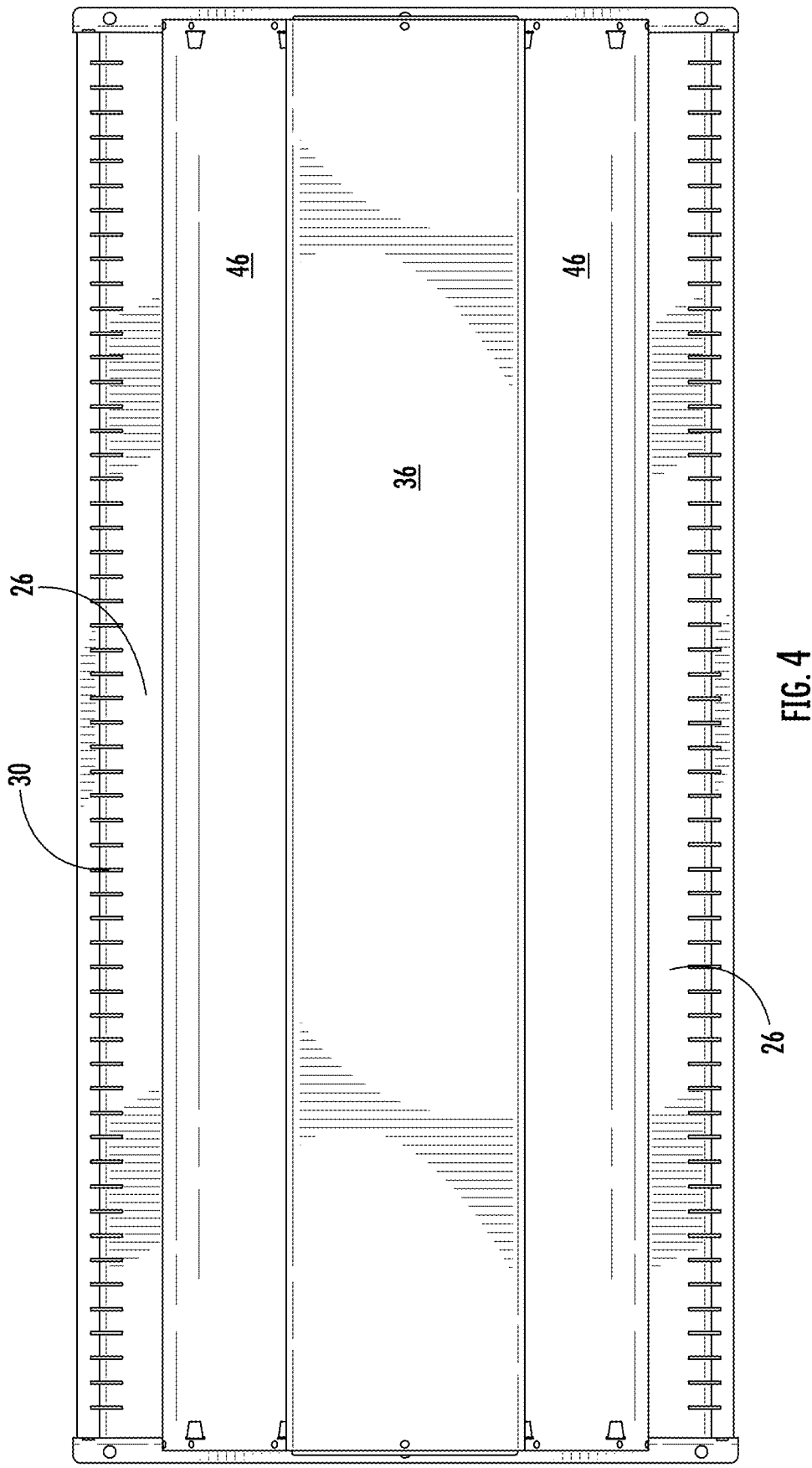
FIG. 4 is a top plan view of the feeder of FIG. 1.
Figure 5:
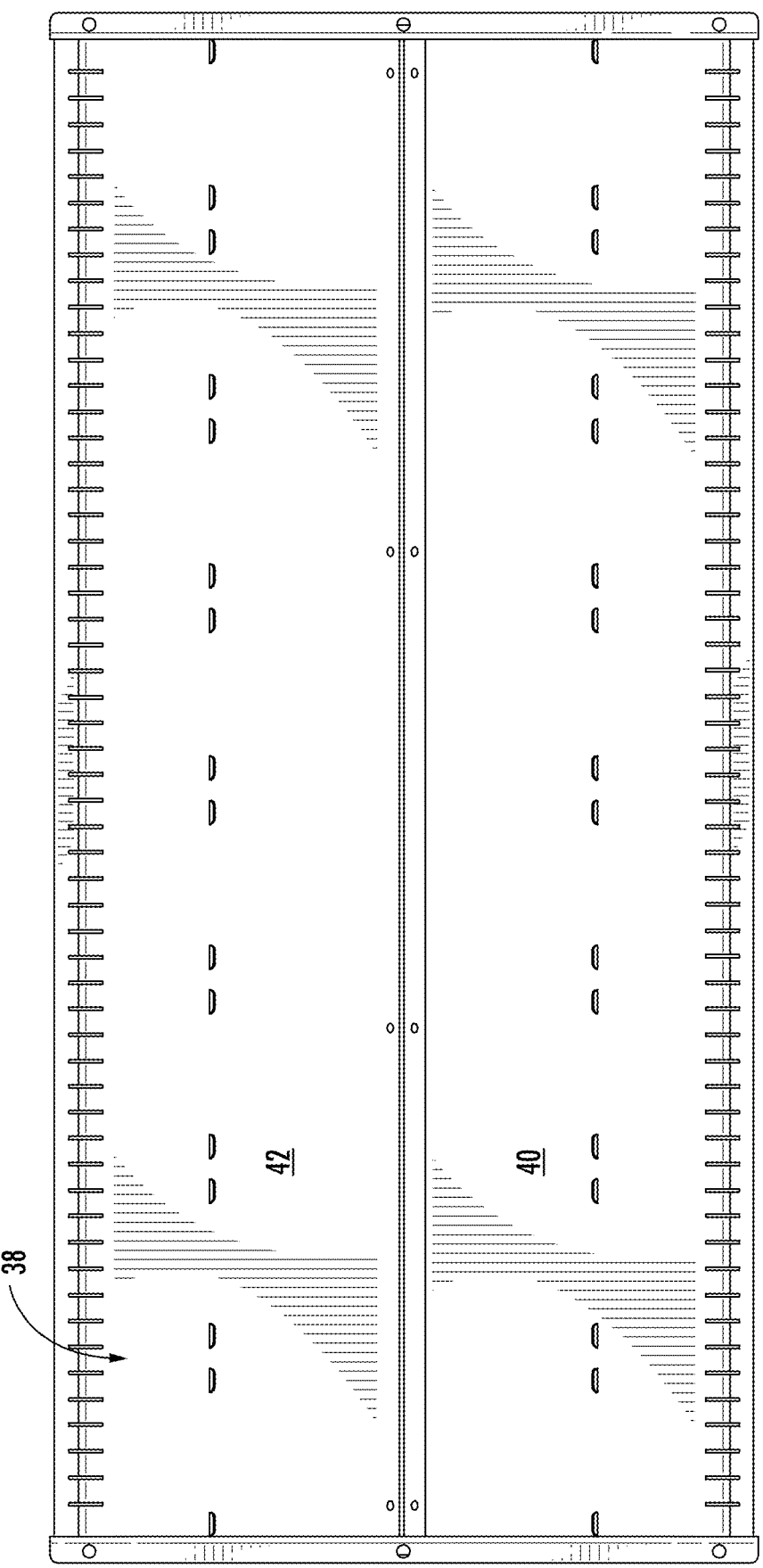
FIG. 5 is a bottom plan view of the feeder of FIG. 1.

Now, referring to the drawings wherein identical reference numerals denote the same elements throughout the various views, FIGS. 1-7 illustrate an exemplary feeder (alternatively referred to as a "feeder", "feed trough", or "trough"). The feeder 10 is generally a hollow enclosure having left and right sides 12, 14 respectively, and extending from a first end 16 to a second end 18 and between a top 20 and a bottom 22. An upper portion of the enclosure defines a elongated feed reservoir 24, which in this case is roughly cylindrical. A pair of sloped feed dishes 26 are disposed adjacent the bottom 22 of the feeder 10, one flanking each side of the feed reservoir 24. (Alternatively, only a single feed dish 26 may be provided). Each feed dish 26 is surrounded by a raised lip 28 which may include a plurality of drain openings 30. The feed reservoir 24 communicates with the feed dishes 26 through a plurality of dispensing openings 32 formed in a wall of the feed reservoir. The top of the feed reservoir 24 incorporates a fill opening 34 which is closed off by a lid 36 that can be selectively opened or removed.

Figure 6:
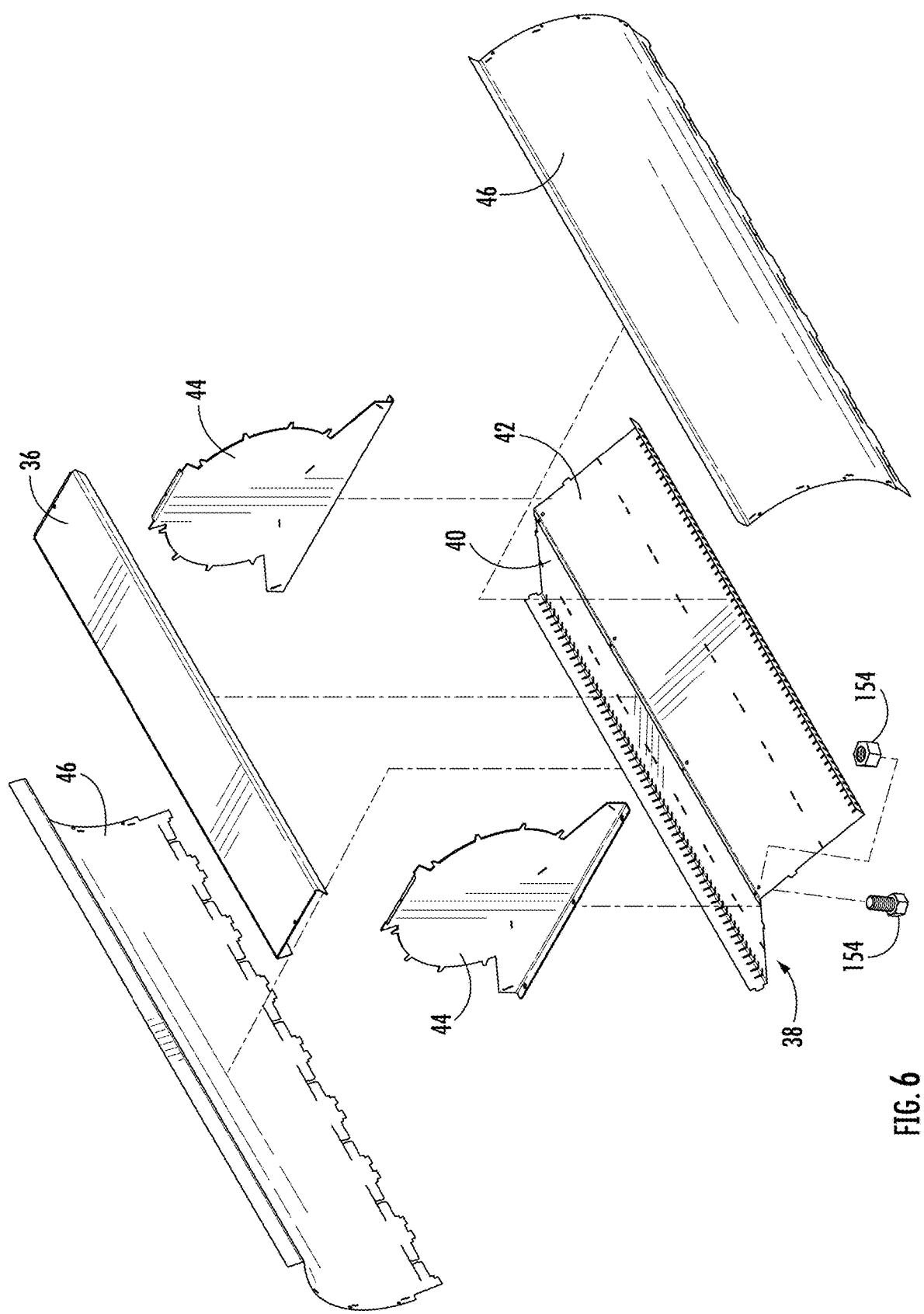
FIG. 6 is an exploded perspective view of the feeder of FIG. 1.

Referring to FIG. 6, the basic components of the feeder 10 are: a tray assembly 38 which may include first and second trays 40, 42, a pair of identical end plates 44, a pair of identical side panels 46, and the lid 36.

Figure 7:
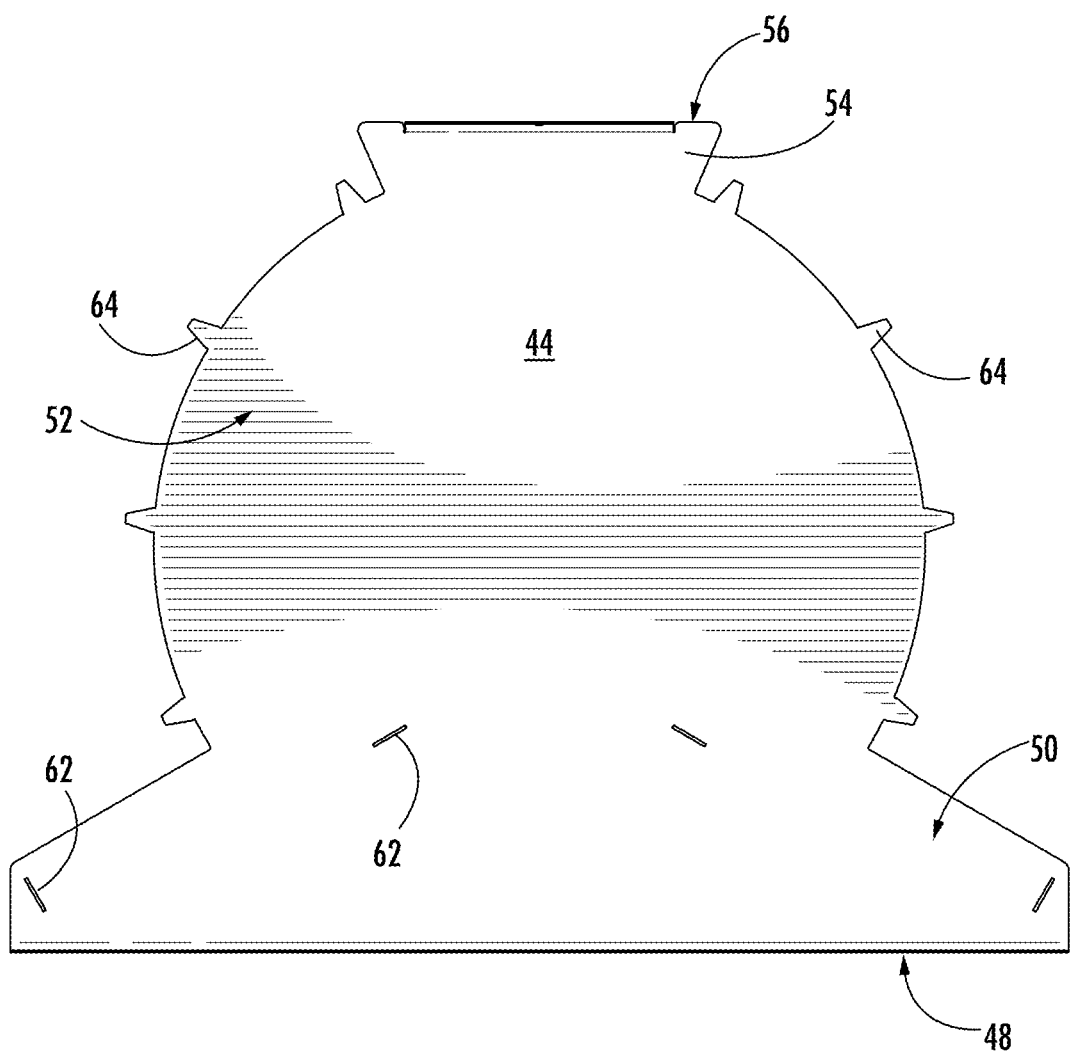
FIG. 7 is a front view of an end plate of a feeder.
Figure 8:
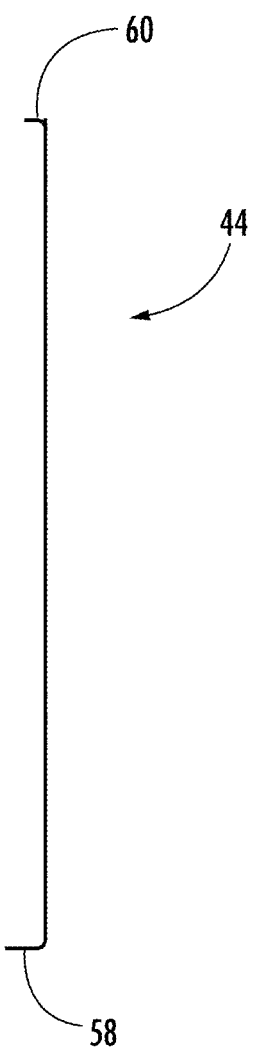
FIG. 8 is a side view of the end plate of FIG. 7.
Figure 9:
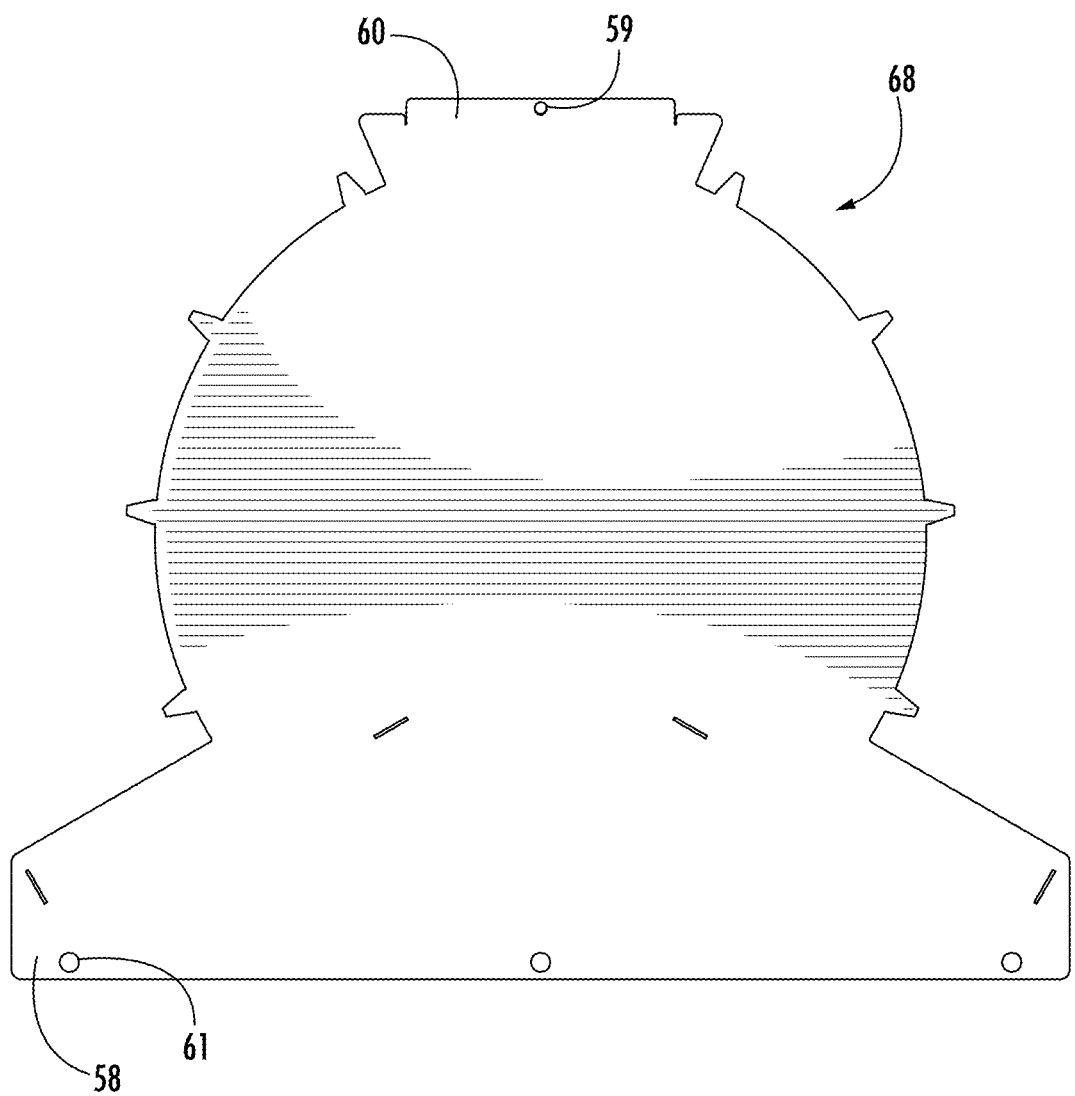
FIG. 9 is a plan view of a flat blank for the end plate of FIG. 7.

A representative end plate 44 is shown in FIGS. 7 and 8. It has a straight bottom edge 48, a lower portion 50 shaped as a truncated triangle, a generally circular upper portion 52, and a dovetail-shaped tab 54 adjoining its upper edge 56. A narrow bottom flange 58 extends perpendicular to the bottom edge 48, and a top flange 60 extends perpendicular to the upper edge 56. Referring to FIG. 9, a lock hole 59 may be formed through the top flange 60, and mounting holes 61 may be formed through the bottom flange 58.

A plurality of tray mounting slots 62 are formed through the thickness of the end plate within the lower portion 50.

A plurality of connector tabs 64 extend outward from the lateral edges 66 of the upper portion 52. In the illustrated example, they taper in width, being narrower at their distal ends.

As will be explained in more detail below, the end plate 44 may be formed from flat material. A representative end plate blank 68 is shown in FIG. 9.

Figure 10:
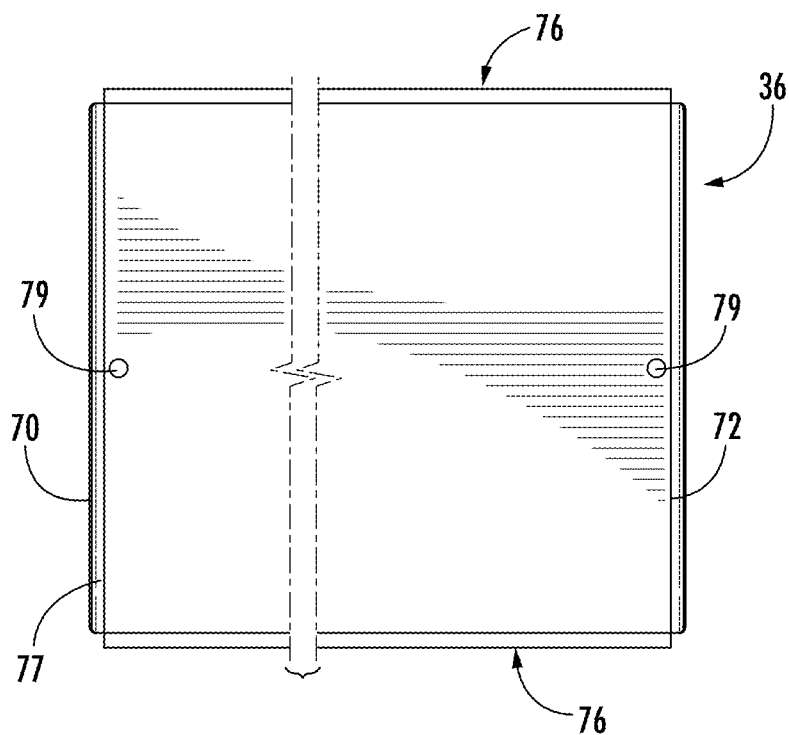
FIG. 10 is a top view of a lid of a feeder.
Figure 11:
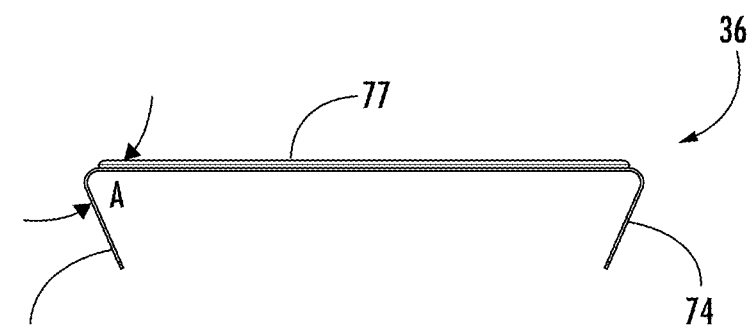
FIG. 11 is an end view of the lid of FIG. 10.

The lid 36 is shown in FIGS. 10 and 11. It is generally rectangular in plan view, extending from a first end 70 to a second end 72. It includes a pair of side flanges 74 which extend away from its longitudinal edges 76. As described in more detail below, the side flanges 74 are complementary to the tabs 54 of the end plates 44. Accordingly, they are disposed at an acute angle "A" to the surface of the lid 36. A small finger flange 77 may be formed at the first end 70, the second end 72, or both ends. A lock hole 79 is formed at the second end 72, the first end 70, or both ends.

Figure 12:
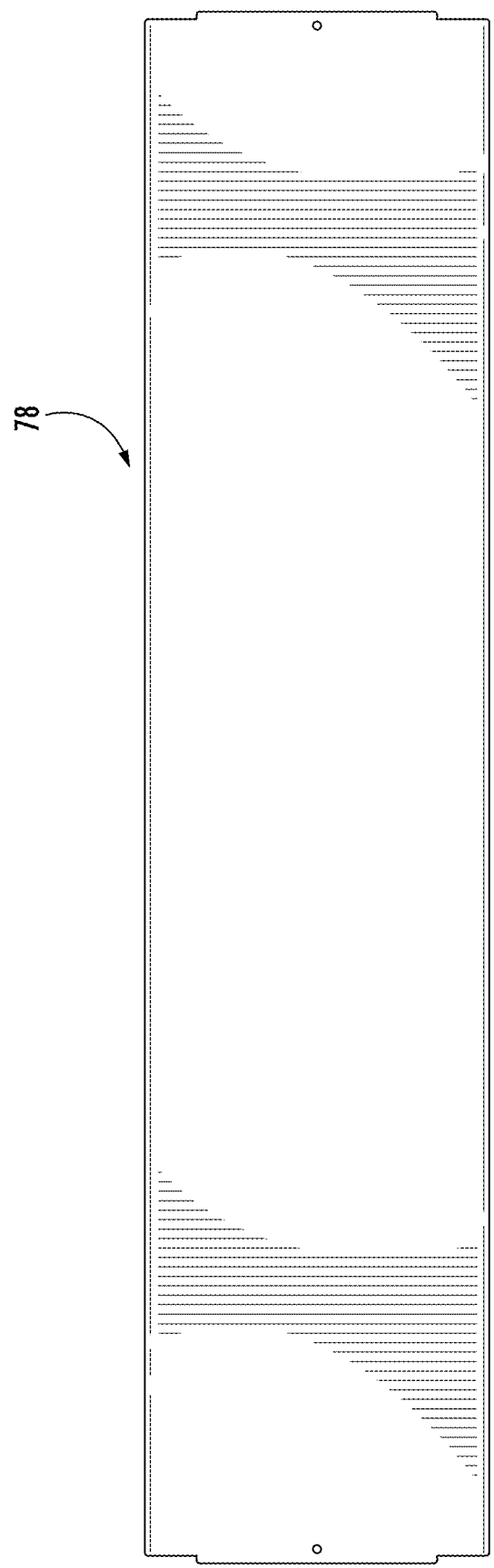
FIG. 12 is a plan view of a flat blank for the lid of FIG. 10.

As will be explained in more detail below, the lid 36 may be formed from flat material. A representative lid blank 78 is shown in FIG. 12.

Figure 13:
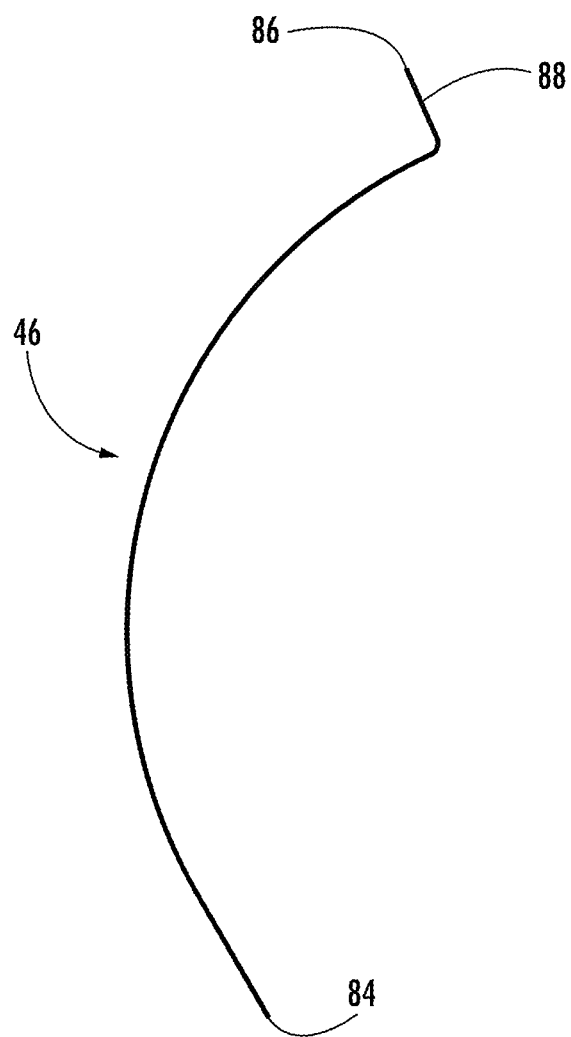
FIG. 13 is an end view of a side panel of a feeder.
Figure 14:
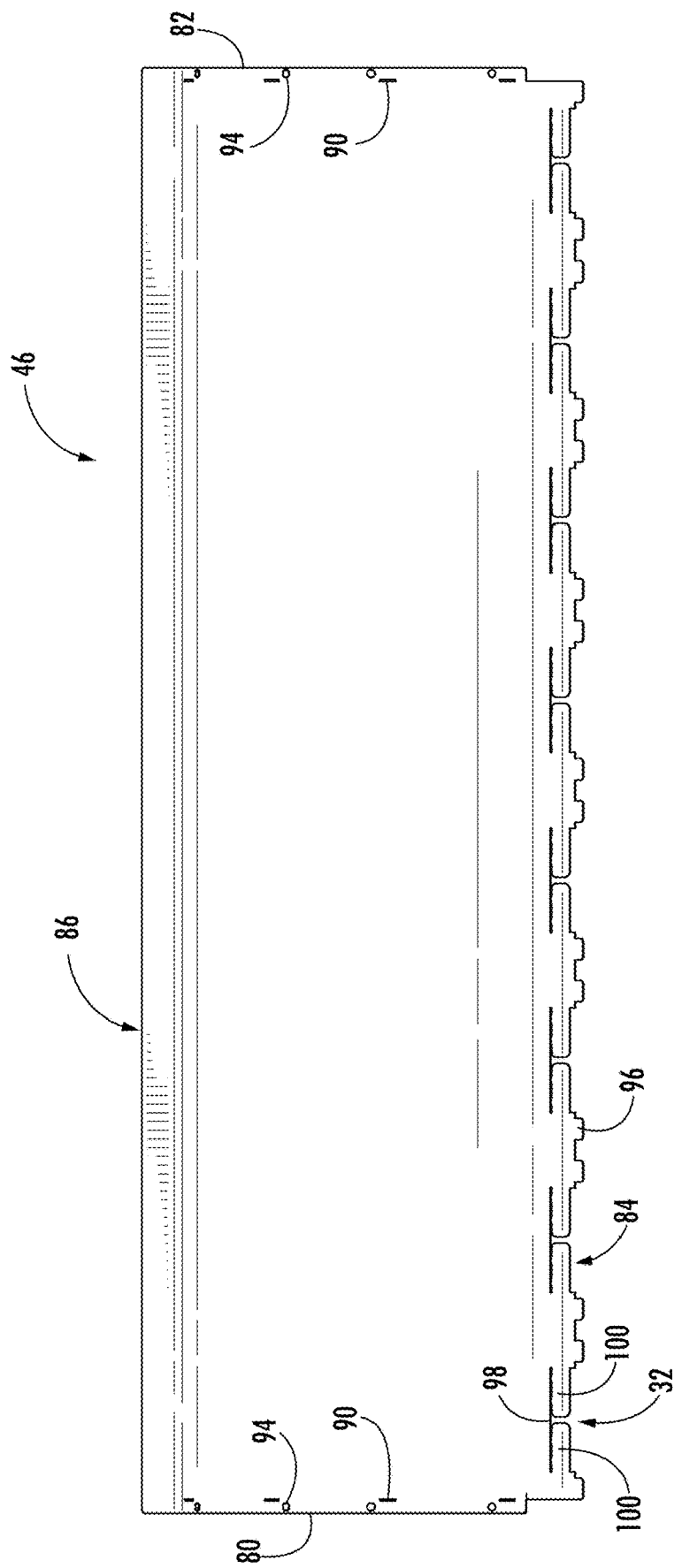
FIG. 14 is a side view of the side panel of FIG. 13.

A representative side panel 46 is shown in FIGS. 13 and 14. Its shape is arcuate, for example generally a segment of a cylinder, extending from a first end 80 to a second end 82, and from a lower edge 84 to an upper edge 86. A top flange 88 is formed at the upper edge 86. The top flange 88 extends extend at an angle roughly perpendicular to the local surface of the side panel 46.

A plurality of end plate mounting slots 90 are formed through the thickness of the side panel 46 along each of the first and second ends 80, 82.

Optionally, a plurality of cladding mounting holes 94 are formed through the thickness of the side panel 46 along each of the first and second ends 80, 82.

A plurality of connector tabs 96 extend downward from the lower edge 84 of the side panel 46.

Adjacent the lower edge 84, a linear array of T-shaped slots 98 are formed through the thickness of the side panel 46. These slots 98 divide the lower portion of the side panel 46 into a series of opposed pairs of fingers 100. As will be described in more detail below, these fingers can be bent to define the dispensing openings 32 described above. In alternative embodiments, only one finger is provided for each dispensing opening 32.

Figure 15:
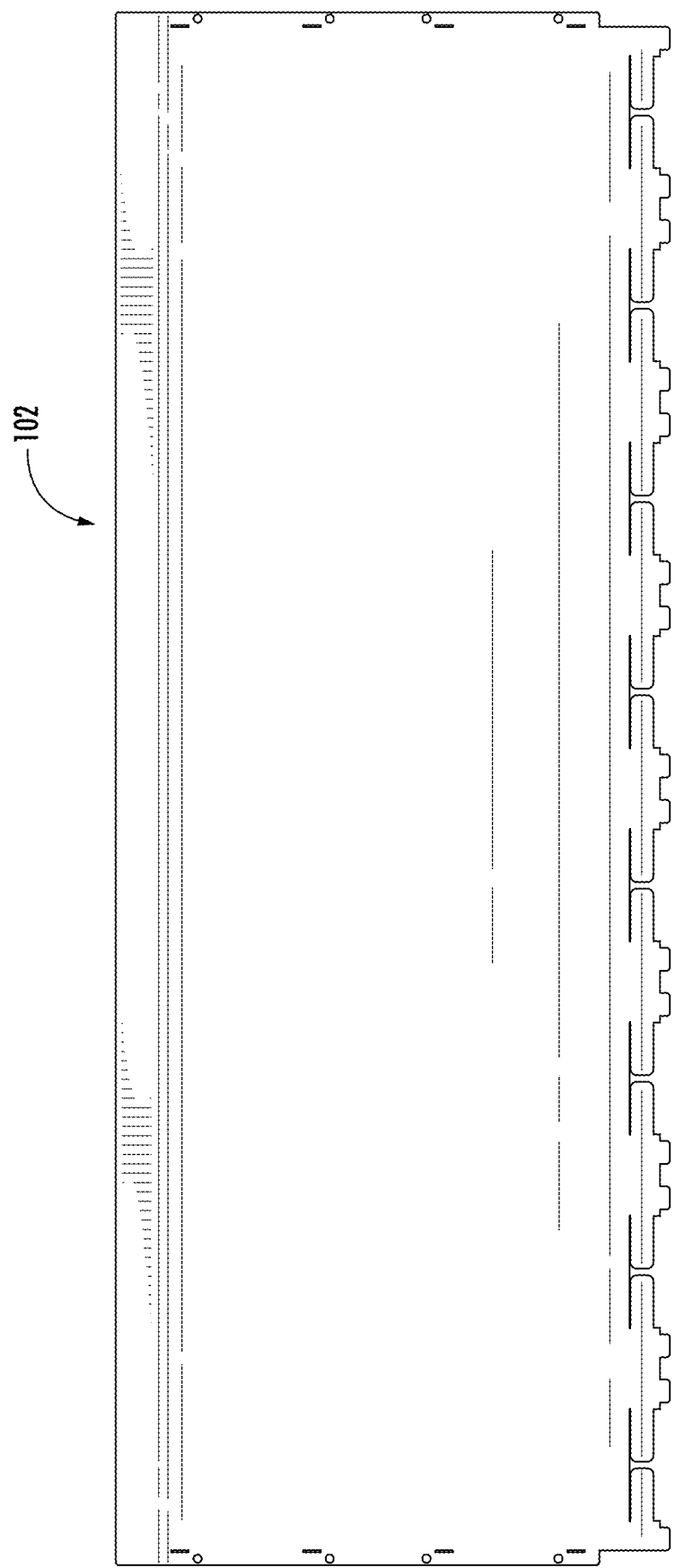
FIG. 15 is a plan view of a flat blank for the side panel of FIG. 13.

As will be explained in more detail below, the side panel 46 may be formed from flat material. A representative side panel blank 102 is shown in FIG. 15.

The tray assembly 38 is generally an inverted "V" shape with two opposite sloped sides. It may be one piece, but in the illustrated example it is built up from first and second trays 40, 42.

Figure 16:
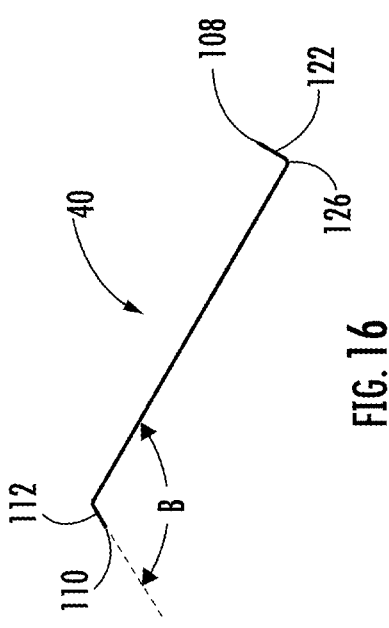
FIG. 16 is an end view of a first tray of a feeder.
Figure 17:
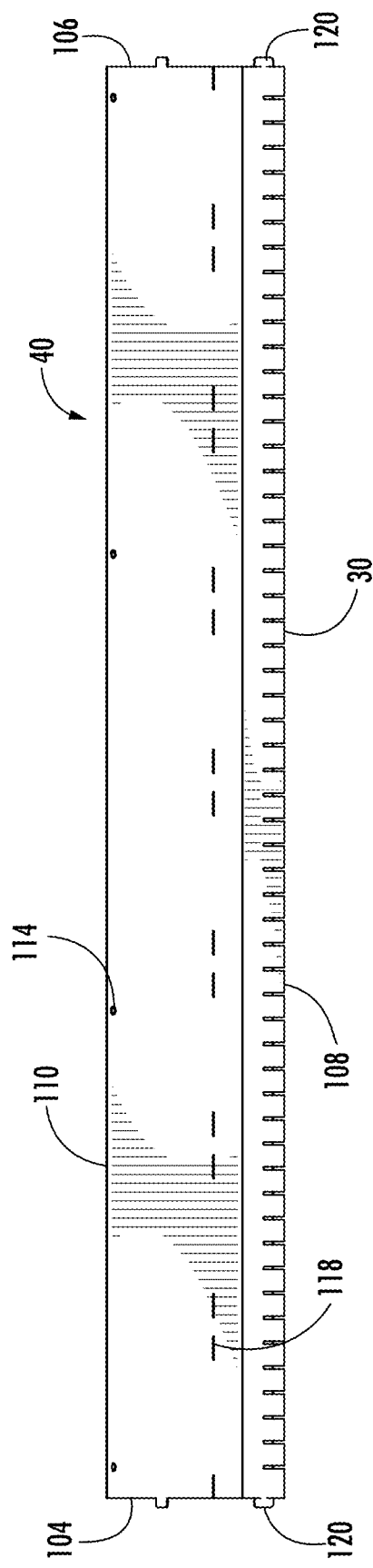
FIG. 17 is a side view of the first tray of FIG. 16.

A first tray 40 is shown in FIGS. 16 and 17. Its shape is generally rectangular, extending from a first end 104 to a second end 106, and from a lower edge 108 to an upper edge 110. A top flange 112 is formed at the upper edge 110. The top flange 112 is oriented at an obtuse angle "B" to the surface of the first tray 40.

A plurality of connecting holes 114 are formed through the thickness of the first tray 40 adjacent the upper edge 110. In the illustrated example, the connecting holes 114 are arranged as a plurality of pairs, where each pair straddles the apex 116 of the top flange 112.

A plurality of side panel mounting slots 118 are formed through the thickness of the first tray 40.

A plurality of connector tabs 120 extend outward from the first and second ends 104, 106 of the first tray 40.

A bottom flange 122 is formed at the lower edge 108. The bottom flange 122 extends roughly perpendicular to the surface of the first tray 40. The bottom flange 122 is angled opposite to the top flange 112. Accordingly, the first tray 40 may be described as having shallow S-shape in end view.

Adjacent the lower edge 108, a linear array of drain openings 30 are formed through the thickness of the side panel 46. The drain openings 30 straddle the apex 126 of the bottom flange 122.

Figure 18:
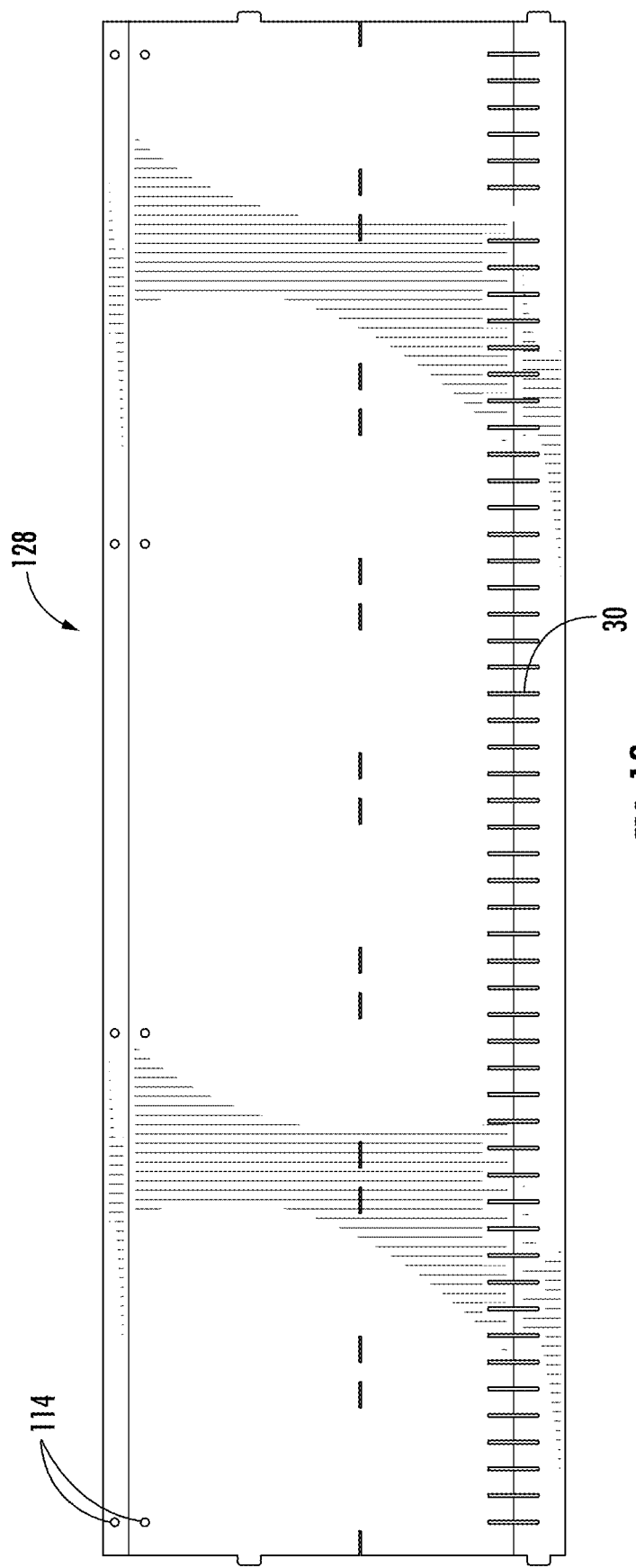
FIG. 18 is a plan view of a flat blank for the first tray of FIG. 16.

As will be explained in more detail below, the first tray 40 may be formed from flat material. A representative first tray blank 128 is shown in FIG. 18.

Figure 19:
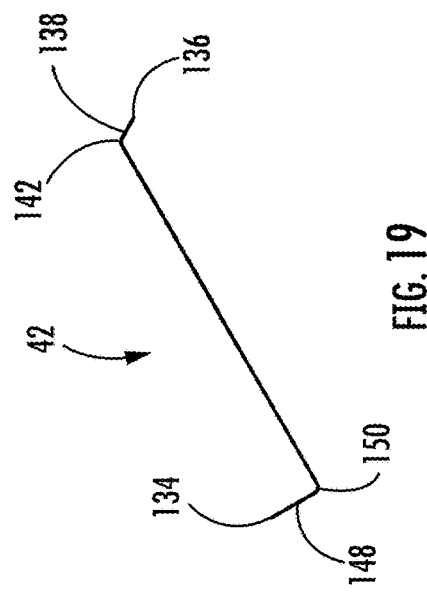
FIG. 19 is an end view of a second tray of a feeder.
Figure 20:
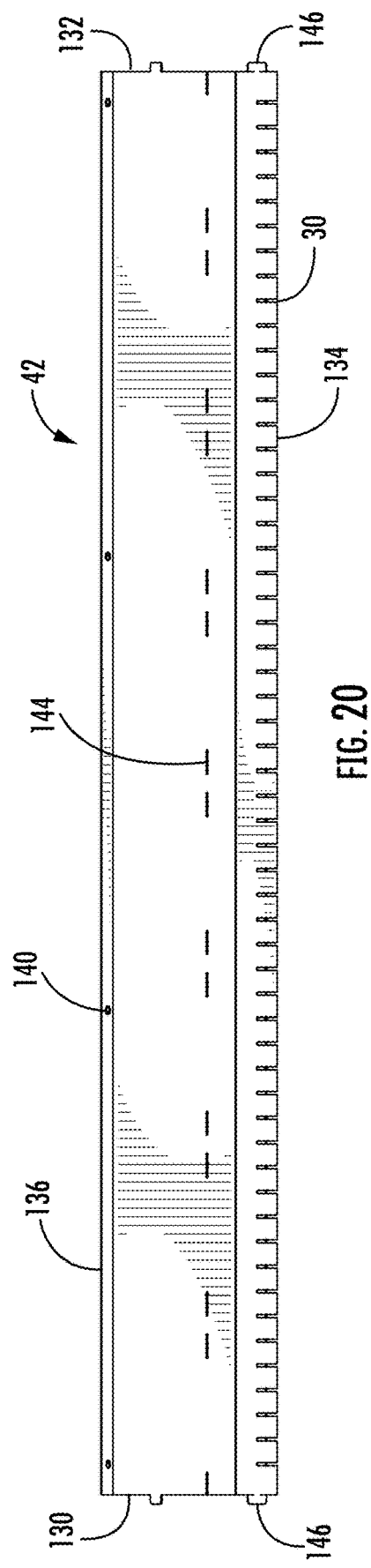
FIG. 20 is a side view of the second tray of FIG. 19.

A second tray 42 is shown in FIGS. 19 and 20. It is generally similar in construction to the first tray 40. Elements of the second tray 42 not explicitly described may be taken to be identical to the corresponding elements of the first tray 40. It extends from a first end 130 to a second end 132, and from a lower edge 134 to an upper edge 136. A top flange 138 is formed at the upper edge 136.

A plurality of connecting holes 140 are formed through the thickness of the second tray 42 adjacent the upper edge 136. In the illustrated example, the connecting holes 140 are arranged as a plurality of pairs, where each pair straddles the apex 142 of the top flange 138.

The shape, dimensions, and angles of the top flange 116 of the first tray 40 and the top flange 138 of the second tray 42 are selected so that they can be nested together in an overlapping relationship defining a stiffening spine. When thus nested together, the connecting holes 114 of the first tray 40 are coaxial with respective connecting holes 140 of the connecting holes of the second tray 42.

A plurality of side panel mounting slots 144 are formed through the thickness of the second tray 42.

A plurality of connector tabs 146 extend outward from the first and second ends 130, 132 of the second tray 42.

A bottom flange 148 is formed at the lower edge 134. Adjacent the lower edge 134, a linear array of drain openings 30 are formed through the thickness of the side panel 46. The drain openings 30 straddle the apex 150 of the bottom flange 148.

Figure 21:
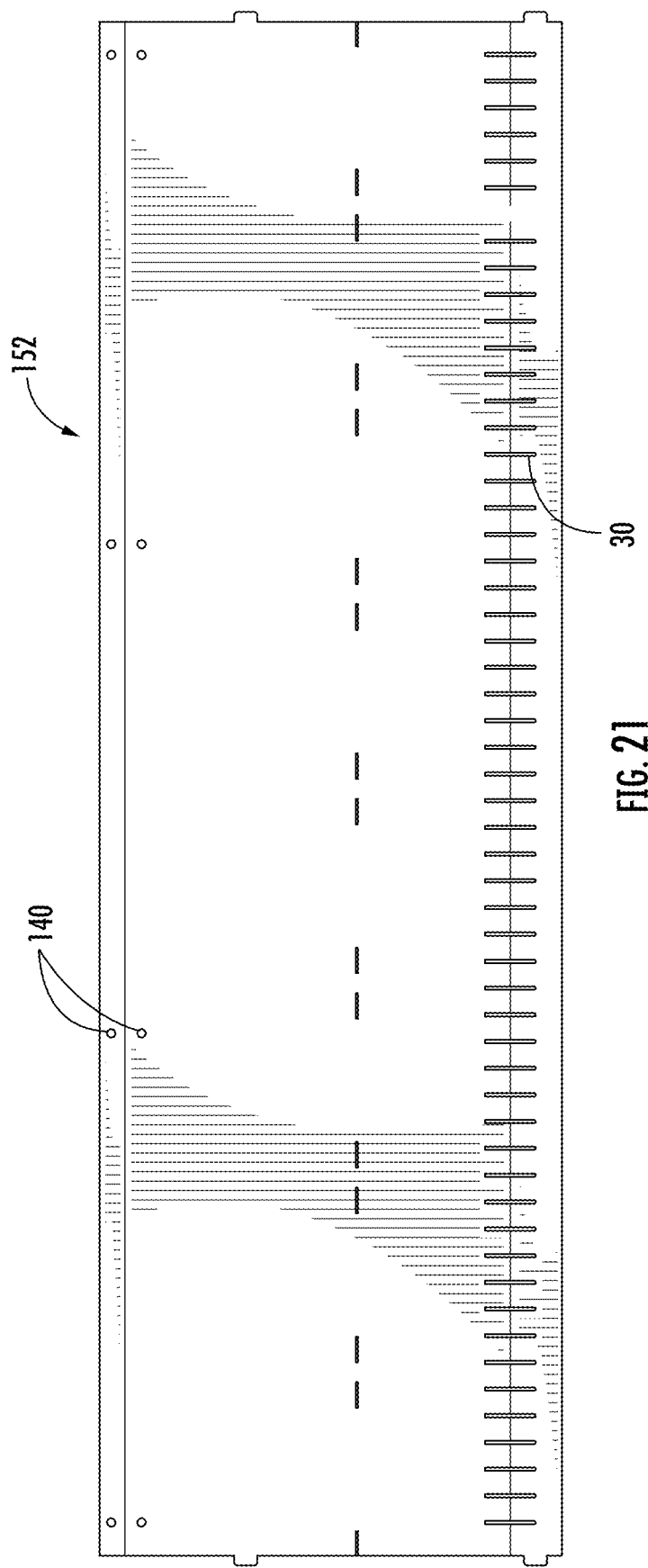
FIG. 21 is a plan view of a flat blank for the second tray of FIG. 19.

As will be explained in more detail below, the second tray 42 may be formed from flat material. A representative second tray blank 152 is shown in FIG. 21.

All of the main components of the feeder 10 may be constructed from generally flat panels or sheet-like components. Any material with adequate strength and environmental durability may used to form the blanks. Nonlimiting examples of suitable materials include wood or other fibrous materials, plastics, metals, or composites. Non-limiting examples of metals include mild steel, galvanized steel, aluminum, or copper. In the illustrated example, the blanks are constructed from sheet metal which provides good durability and ability to be formed into curved or bent shapes. In one example, the blanks may be manufactured from galvanized 20 gauge steel, which is approximately 1 mm thick (0.04 in.)

The individual components may be manufactured from sheet material, such sheet metal which is commercially supplied in roll form or rectangular sheet form. The perimeter shape of the components, including the tabs, flanges, and so forth, may be formed from the sheet material by processes such as sawing, stamping, punch pressing, CNC routing, waterjet cutting, or laser cutting. The various openings such as holes and slots may be formed from the sheet material by processes such as sawing, stamping, punch pressing, CNC routing, waterjet cutting, laser cutting, or drilling. Combination processes may be used. For example, stamping may be used to cut exterior shapes as well as to form slots or holes. In another example, laser cutting may be used to form exterior shapes as well as forming slots or holes. For simplicity, any process used to form the perimeter shape of the components, may be referred to as a "cutting" operation.

The cut components may then be bent to form the various curves and flanges. Curves may be formed by tools such as bending brakes, press brakes, slip rollers, or hydro formers. Flanges may be formed by tools such as bending brakes, or press brakes. Once cut and shaped, the components are ready for assembly.

If first and second trays 40, 42 are used, they are assembled by nesting or lapping their mutual top flanges 112, 138 together. The upper flanges 112, 138 are then securely joined. Processes such as adhesives, thermal bonding, brazing, welding, sonic bonding, or folding and crimping may be used. Alternatively, fasteners such as screws, bolts and nuts, or rivets may be used. As one example, bolts and nuts 154 (one set shown in FIG. 6) may be placed through the coaxial connecting holes 114, 140 and securely tightened to clamp the first and second trays 40, 42 together, forming the tray assembly 38. When secured together, the overlapping top flanges 112, 138 form a structural "spine" which provides the tray assembly 38 with structural stiffness. The first and second trays 40,42 are oriented at a obtuse angle to each other, defining a gable roof shape.

Next, the end plates 44 are assembled to the tray assembly 38. The connector tabs 120, 146 of the tray assembly 38 may be inserted into the tray mounting slots 62 of the end plates 44. The connector tabs 120, 146 may then be bent down tightly against the end plates 44, for example using hammer. Additionally or as an alternative, the connector tabs 120, 146 may be secured using adhesive, fasteners or a bonding process.

Next, the side panels 46 are assembled to the tray assembly 38 and the end plates 44. The connector tabs 96 of the side panels 46 may be inserted into the side panel mounting slots 118, 144 of the respective tray 40, 42. The connector tabs 64 of the end plates 44 may be inserted into the end plate mounting slots 90 of the side panels 46. The connector tabs may then be bent down tightly against the respective panels, for example using a hammer. Additionally or as an alternative, the connector tabs may be secured to the respective panels using adhesive, fasteners or a bonding process.

After the panels are assembled, any open joints may be sealed with a material such as adhesive or caulk to prevent water ingress.

Collectively, the dovetail tabs 54 of the end plates 44 and the top flanges 88 of the side panels define the fill opening 34.

The lid 36 and the fill opening 34 have complementary dovetail shapes. The lid 36 may be attached by sliding it in a longitudinal direction over the fill opening 34. A lock pin or similar fastener (not shown) may be placed through the coaxial lock holes 79, 59 respectively of the lid 36 and the end plate 44 to hold the lid 36 in place.

Figure 22:
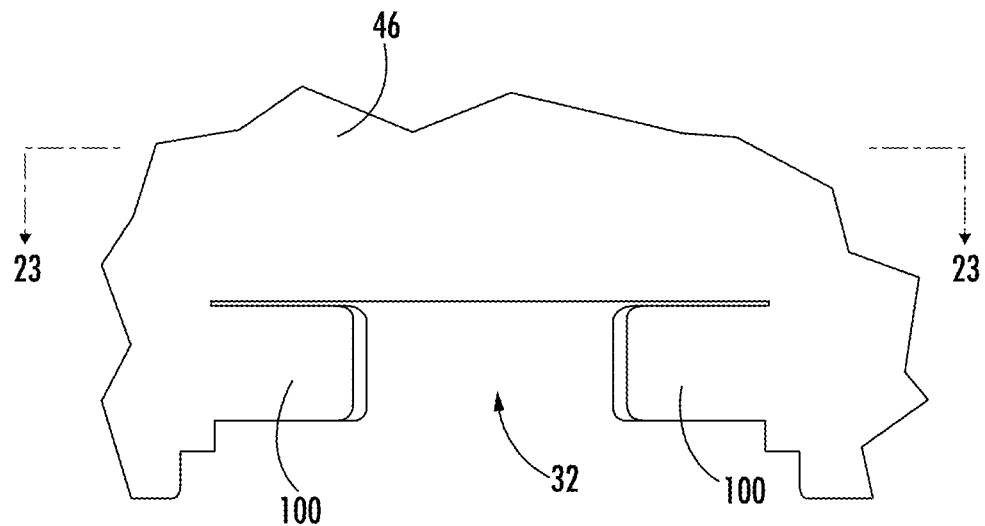
FIG. 22 is an enlarged view of a portion of a side panel, showing a dispensing opening.
Figure 23:
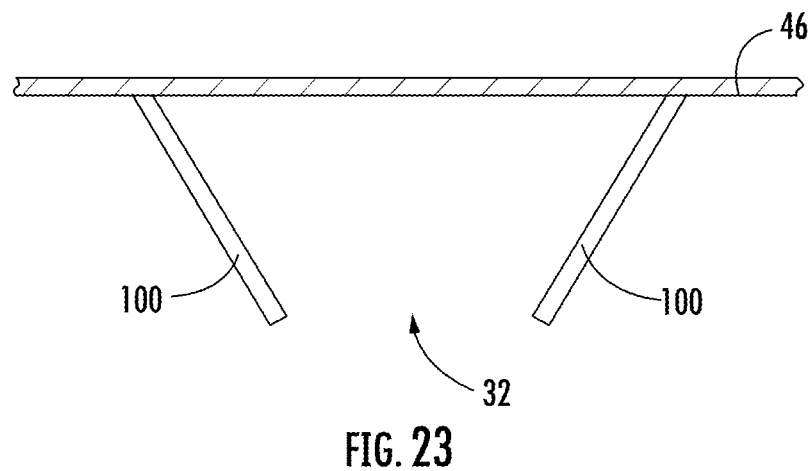
FIG. 23 is a view taken along lines 23-23 of FIG. 22.

The fingers 100 may be bent outwards to expose the dispensing openings 32. The fingers 100 at least partially block the dispensing openings 32. It will be understood that the further the fingers 100 are bent away from the surface of the side panel 46, the larger an opening is formed. In one example, if the fingers 100 are bent to a 90° angle, a dispensing opening 32 having a width of approximately 10 cm (4 in.) will be formed. Given that the panel typically has some ductility, it is possible to adjust the fingers 100 to wider or narrower positions as desired. However, it is envisioned that as a general practice the fingers 100 would be opened large enough to permit a clog-free flow of feed while not overflowing the feed dish 26. FIGS. 22 and 23 show an example of the fingers 100 bent outward to a partially open position.

The assembly steps described above may be performed at the time of manufacture. Alternatively, once the individual panels are formed, they may be packaged, optionally with fasteners and/or sealant, and distributed, with the expectation that the consumer would assemble the feeder 10. The components of the feeder 10 may be stacked in a nested position, as an array of components, prior to assembly and suitable for shipment and storage. Packing the components like this greatly reduces the volume needed for shipping and storage.

The feeder 10 is used by placing it in a suitable location. The lid 36 is slid open and granular animal feed or some other attractant (granular material attractive to animals) is put in the fill opening 34. The lid 36 can then be slid closed and secured with a lock pin or similar fastener (not shown) placed through the coaxial lock holes 79, 59 respectively of the lid 36 and the end plate 44 to hold the lid 36 in place. The shape of the tray assembly 38 promotes gravity flow of the grain down and out through the dispensing openings 32. The feed dishes 26 that capture and accumulate the grain that falls by gravity through the dispensing openings 32. The raised lip 28 around each feed dish 26 retains the grain, while the drain openings 30 permit water and small debris to fall through. The fingers 100 will retard most of the grain from overflowing the feed dishes 26 onto the surrounding ground. The feed dishes 26 are wide and flat and therefore minimize choking or jamming of the grain as it feeds out. The feed dishes 26 extend laterally along the length of the feeder 10, promoting even flow of grain along the length of the feeder 10 and permitting several animals to feed at the same time. Placement of the feed dishes 26 on both sides of the feeder 10 further promotes even flow of grain along the length of the feeder 10 and permits several animals to feed at the same time on opposite sides of the feeder 10. While the slope of the feed dishes 26 may vary, in one preferred embodiment the angle of declination of the feed dishes 26 from the horizontal is approximately 30 degrees, but may optionally be between 15 and 35 degrees. The drain openings 30 are sized small enough to retain the granular feed, but large enough to permit water to flow through. For example, they may be about 3 mm wide.

The general shape of the feeder 10 presents a natural outward appearance of a fallen log, something a forest animal such as a deer would be familiar with and would likely find non-threatening. To further enhance this natural appearance, the feeder 10 may be camouflaged. In one example, this may be accomplished by a surface decoration. This could take the form of a coating such as paint, baked-on powder coating, or a printed vinyl wrap. The surface decoration may be a solid color or may incorporate a pattern such as a silkscreen print of a tree bark pattern.

To further extend the natural appearance, the surface decoration may include texture or three-dimensional aspect. One option is to apply a surface cladding to the feeder 10.

Figure 24:
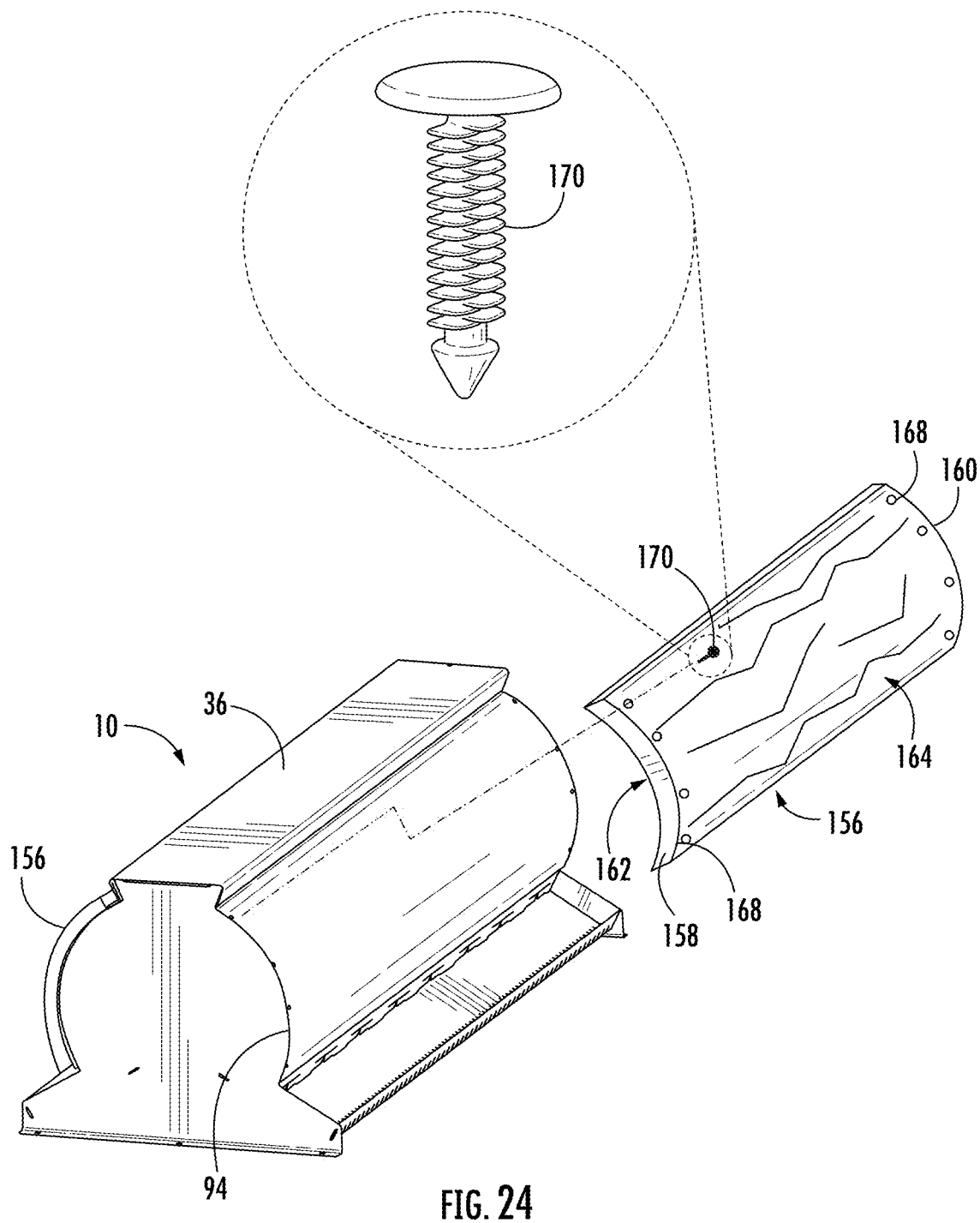
FIG. 24 is an exploded perspective view of a feeder with a cladding panel.

FIG. 24 illustrates one particular example of surface cladding. This takes the form of a pair of cladding panels 156, one for each side panel 46. Each cladding panel 156 extends between first and second ends 158, 160 and is generally formed as a segment of a cylinder. The cladding panel 156 has an interior surface 162 and an opposite exterior surface 166. The interior surface 162 may be generally smooth to fit flush against the side panel 46. The exterior surface 166 may be formed in a three-dimensional pattern such as a tree bark configuration, woodgrain, or another naturally occurring object. As one example, the cladding panel 156 may be molded from plastic such as ABS.

The cladding panel 156 may be attached to the feeder 10, for example by forming holes 168 in the cladding panel 156 and pushing ribbed fasteners 170 of the type known as "Christmas tree fasteners" through the holes 168 and into the cladding mounting holes 94 of the side panels 46. Alternatively, the cladding panels 156 may be attached by an adhesive, hook and loop fasteners, or other types of mechanical fasteners.

Figure 25:
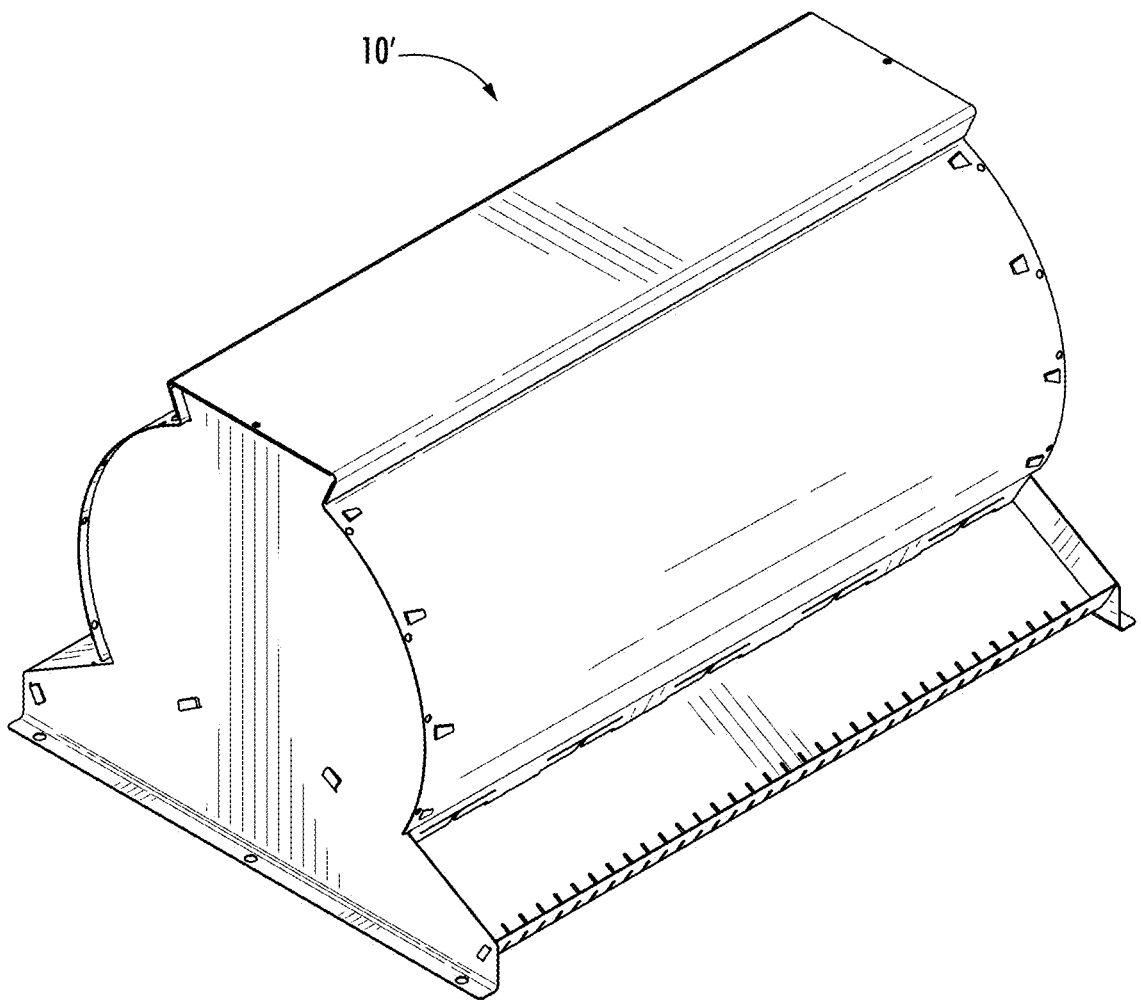
FIG. 25 is a perspective view of another exemplary feeder.

While size and capacity can substantially vary, in one preferred embodiment the feeder 10 has a length of approximately 150 cm, a height of approximately 54 cm, and a width of approximately 68 cm. Grain capacity may be approximately 200 kg. depending on the type of grain, moisture content and similar factors. FIG. 25 illustrates an example feeder 10' which is approximately half as long between endplates as the feeder 10, but maintains the other dimensions. Scaling in this manner may permit efficient production of multiple feeders from one standard commercial size sheet of metal.

The foregoing has described an animal feeder. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An animal feeder, comprising:
   a tray assembly defining at least one sloped feed dish;
   a reservoir communicating with the tray assembly, the reservoir having a fill opening;
   dispensing openings formed in a wall of the reservoir configured to permit granular animal feed to flow by gravity from the reservoir into the at least one sloped feed dish;
   wherein each of the dispensing openings is partially blocked by at least one finger formed in the wall of the reservoir; and
   wherein each of the dispensing openings is formed by a T-shaped slot in wall of the reservoir, the T-shaped slot also forming a pair of opposed fingers.

2. The animal feeder of claim 1, wherein the tray assembly includes first and second trays joined to each other, defining a gable roof shape.

3. The animal feeder of claim 2, wherein the first and second trays are joined at mutually overlapping top flanges.

4. The animal feeder of claim 1, wherein the reservoir is generally cylindrical.

5. The animal feeder of claim 1, wherein the at least one feed dish includes drain openings.

6. The animal feeder of claim 1, further comprising a lid for covering the fill opening.

7. The animal feeder of claim 6, wherein the lid and the fill opening have complementary dovetail shapes.

8. The animal feeder of claim 1, wherein the reservoir is defined by a pair of spaced-apart end plates interconnected by a pair of spaced-apart side panels.

9. The animal feeder of claim 8, wherein:
   the end plates have tabs which are received in slots of the side panels; and
   the side panels have tabs which are received in slots of the tray assembly.

10. The animal feeder of claim 1, further comprising a cladding panel attached to an exterior of the reservoir, the cladding panel comprising a tree bark surface configuration.

11. The animal feeder of claim 1, wherein the tray assembly includes first and second feed dishes on opposite sides of the reservoir.

12. The animal feeder of claim 11, wherein each feed dish is bounded by a raised lip.

13. An animal feeder according to claim 1, wherein the animal feeder is adapted to be stacked in an array of components prior to assembly for shipping.

14. An animal feeder, comprising:
   first and second trays defining sloped first and second feed dishes, the first and second trays connected at mutual top flanges defining a gable roof shape;
   first and second end plates connected to the first and second trays;
   first and second side panels connected to the end plates and the trays, such that the end plates and the side panels cooperatively define a generally cylindrical reservoir communicating with the tray assembly, the reservoir having a fill opening; and
   a plurality of dispensing openings formed in the side panels configured to permit granular animal feed to gravity flow from the reservoir into the sloped first and second feed dishes.

15. The animal feeder of claim 14, wherein:
   the end plates have tabs which are received in slots of the side panels;
   the side panels have tabs which are received in slots of the first and second trays; and
   the first and second trays have tabs which are received in slots of the end plates.

16. The animal feeder of claim 14, wherein each dispensing opening is partially blocked by at least one finger formed in one of the side panels.

17. The animal feeder of claim 16, wherein each of the dispensing openings is formed by a T-shaped slot in wall of the reservoir, the T-shaped slot also forming a pair of opposed fingers.

18. The animal feeder of claim 14, wherein the first and second trays, the first and second end plates, and the first and second side panels are formed from sheet metal.

19. The animal feeder of claim 14, further comprising a cladding panel attached to each of the side panels, the cladding panels including a tree bark surface configuration.

20. An animal feeder, comprising:
   a tray assembly defining at least one sloped feed dish;
   a reservoir communicating with the tray assembly, the reservoir having a fill opening;
   dispensing openings formed in a wall of the reservoir configured to permit granular animal feed to flow by gravity from the reservoir into the at least one sloped feed dish;
   wherein each of the dispensing openings is partially blocked by at least one finger formed in the wall of the reservoir;
   wherein the reservoir is defined by a pair of spaced-apart end plates interconnected by a pair of spaced-apart side panels; and
   wherein:
   the end plates have tabs which are received in slots of the side panels; and
   the side panels have tabs which are received in slots of the tray assembly.

* * * * *